US010853099B2

(12) United States Patent
Xu et al.

(10) Patent No.: US 10,853,099 B2
(45) Date of Patent: Dec. 1, 2020

(54) SYSTEM, METHOD, AND APPARATUS FOR RENDERING INTERFACE ELEMENTS

(71) Applicant: Alibaba Group Holding Limited, George Town (KY)

(72) Inventors: Qinghe Xu, Shanghai (CN); Xu Zeng, Shanghai (CN); Zheng Liu, Shanghai (CN); Yongcai Ma, Shanghai (CN); Lidi Jiang, Shanghai (CN); Kerong Shen, Shanghai (CN); Decai Jin, Shanghai (CN); Chong Zhang, Beijing (CN)

(73) Assignee: Alibaba Group Holding Limited (KY)

( * ) Notice: Subject to any disclaimer, the term of this patent is extended or adjusted under 35 U.S.C. 154(b) by 29 days.

(21) Appl. No.: 16/031,805

(22) Filed: Jul. 10, 2018

(65) Prior Publication Data

US 2019/0079781 A1    Mar. 14, 2019

Related U.S. Application Data

(63) Continuation-in-part of application No. PCT/CN2017/070983, filed on Jan. 12, 2017.

(30) Foreign Application Priority Data

Jan. 21, 2016 (CN) .......................... 2016 1 0041863

(51) Int. Cl.
*G06F 9/451* (2018.01)
*G06F 9/48* (2006.01)

(52) U.S. Cl.
CPC .............. *G06F 9/451* (2018.02); *G06F 9/485* (2013.01); *G06F 9/4881* (2013.01)

(58) Field of Classification Search
CPC ......... G06F 9/451; G06F 9/485; G06F 9/4881
See application file for complete search history.

(56) References Cited

U.S. PATENT DOCUMENTS

| 9,824,320 B2 * | 11/2017 | DeJardine | .......... G06Q 10/0633 |
| 2001/0051971 A1 * | 12/2001 | Kato | .......... G06F 8/45 718/102 |
| 2004/0056900 A1 | 3/2004 | Blume | |
| 2005/0240930 A1 * | 10/2005 | Amamiya | ............. G06F 9/3012 718/100 |
| 2010/0271388 A1 * | 10/2010 | Gillespie | ................. G06F 9/451 345/592 |

(Continued)

FOREIGN PATENT DOCUMENTS

| CN | 101996073 | 3/2011 |
| CN | 101436304 | 10/2012 |

(Continued)

*Primary Examiner* — Matthew Ell
(74) *Attorney, Agent, or Firm* — Van Pelt, Yi & James LLP

(57) ABSTRACT

A method for rendering interface elements, including: obtaining a first set of one or more interface elements associated with a target user interface (UI) to be rendered, the first set of one or more interface elements comprising one or more interface elements that meet a pre-configured priority condition; rendering the first set of one or more interface elements at a higher priority than other interface elements associated with the target UI; and outputting a rendering result of the first set of one or more interface elements.

22 Claims, 10 Drawing Sheets

(56) References Cited

U.S. PATENT DOCUMENTS

| | | | | |
|---|---|---|---|---|
| 2012/0144288 A1* | 6/2012 | Caruso | ................ | G06F 16/9577 |
| | | | | 715/234 |
| 2013/0132900 A1 | 5/2013 | Peterson | | |
| 2015/0339006 A1* | 11/2015 | Chaland | ................ | G06F 3/0482 |
| | | | | 715/835 |
| 2017/0123850 A1* | 5/2017 | Nakazawa | ............ | G06F 9/4881 |

FOREIGN PATENT DOCUMENTS

| | | |
|---|---|---|
| CN | 102819521 | 12/2012 |
| CN | 101777066 | 8/2013 |
| CN | 103279517 | 9/2013 |
| CN | 105096365 | 11/2015 |
| WO | 2015078211 | 6/2015 |

* cited by examiner

Empty
ListView

ListView
Displaying
Chats

SYSTEM, METHOD, AND APPARATUS FOR RENDERING INTERFACE ELEMENTS

CROSS REFERENCE TO OTHER APPLICATIONS

This application is a continuation-in-part of and claims priority to International (PCT) Application No. PCT/CN17/70983 entitled INTERFACE PROCESSING METHOD, DEVICE AND INTELLIGENT TERMINAL filed Jan. 12, 2017 which is incorporated herein by reference for all purposes, which claims priority to People's Republic of China Patent Application No. 201610041863.2 entitled AN INTERFACE PROCESSING METHOD, DEVICE, AND SMART TERMINAL filed Jan. 21, 2016 which is incorporated herein by reference for all purposes.

FIELD OF THE INVENTION

The present application generally relates to the field of information processing technology and more in particularly, to a system, method, and apparatus for rendering interface elements.

BACKGROUND OF THE INVENTION

The increasing popularity and ubiquity of smart terminal devices such as mobile phones, tablet computers, laptop computers, wearable devices, in-vehicle devices, and Internet of Things (IoT) devices (e.g., smart appliances, etc.) has led to improved ease for users to interact with such terminal devices. At the same time, smart terminal devices are becoming multiple purpose devices, capable of providing users with a variety of applications (APPs) such as Web Browsers, messaging programs, mobile payment programs, social media programs, home automation programs, media players, game players, navigation guidance, and the like. Typically, user interfaces (UIs) play an important role in human-machine interactions driven by application programs. For example, such UIs can be a graphical user interface (GUI), a touchless user interface (e.g., gesture based user interface, etc.), and the like. As such, interface rendering technology (e.g., rendering engines, etc.) is essential to user experience with an application at its interfaces. The more advanced the rendering technology is, the more user-friendliness and richness can be accomplished in the user's interaction with an application on a device, and hence the more attractive a device is to the user.

With the present techniques, one way of rendering a UI is to follow the ordering of the layout configured by the developers for the UI to synchronously render elements thereof until all the elements specified in the layout are rendered. However, when a UI is made up of a large number of interface elements, or when a UI is designed to include an image of a particularly large size, the rendering of such a UI tends to become time-consuming and less responsive. As a result, while awaiting the appearance of the entire UI, a user is more likely to see an empty or blank screen during this type of display lag.

In order to reduce the degree of the afore-described display latency, another present technique provides for displaying static content (e.g., a splash screen) after an application is launched and before the launch screen UI of the application can be rendered in its entirety. At the same time, elements of the UI are being rendered in the background, and displayed in place of the static content upon being properly and completely rendered. Oftentimes, such static content is pre-configured by developers as, for example, a picture, a simple animation, or the like.

Nevertheless, such static content displayed in the lag time may be unrelated to the UI or content to be displayed next. Therefore, a user is still prone to experiencing a noticeable visual glitch or flickering when the static content is replaced with the application UI, leading to a rendering effect that is less intuitive or stylish.

Therefore, a need exists to improve the generating and presenting of user interfaces.

BRIEF DESCRIPTION OF THE DRAWINGS

Various embodiments of the invention are disclosed in the following detailed description and the accompanying drawings.

DETAILED DESCRIPTION

Figure 1:
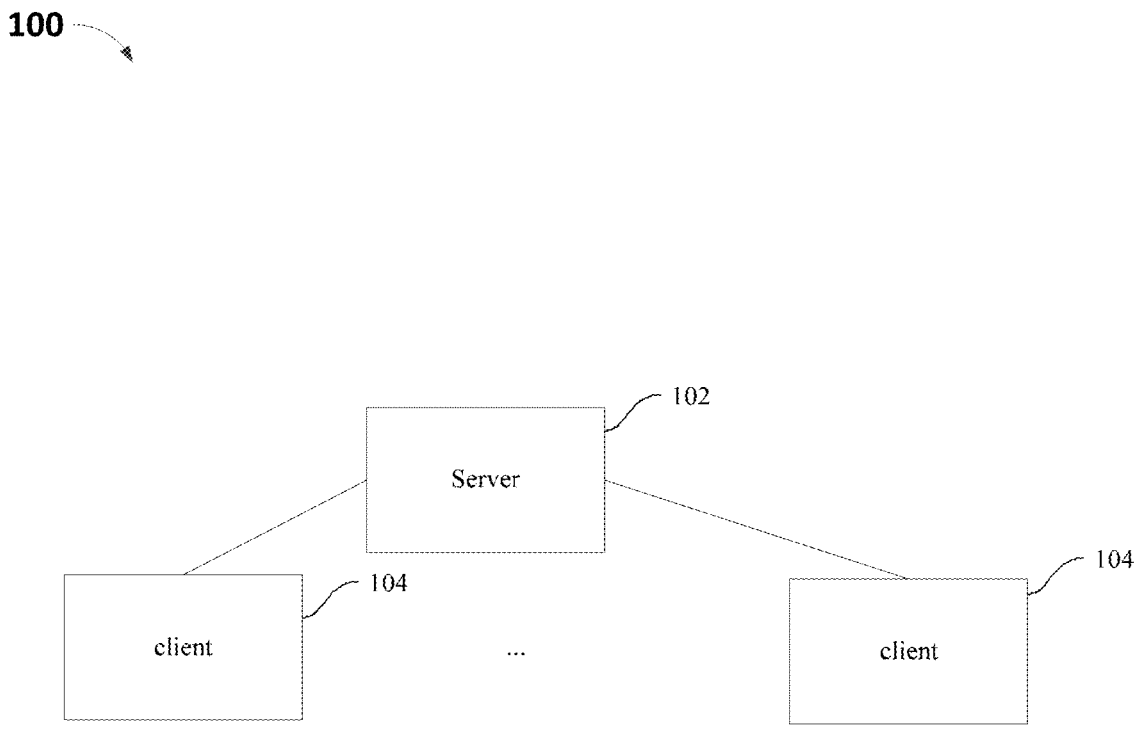
FIG. 1 is a schematic diagram illustrating an example computing system for rendering interface elements, in accordance with one or more embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for rendering interface elements is described herein. With a target UI to be rendered, elements that meet a pre-configured set of one or more priority conditions are included in a first set of one or more elements of the target UI, to be rendered with priority. Upon completion of the rendering, the rendered results of the first set of one or more interface elements are immediately output for display. As such, content related to the target UI is output quickly, increasing the visual effect of the UI rendering. As used herein, the term "rendering" refers to the processing of generating a graphic scene from a model or a scene file that defines a multitude of elements or objects of the graphic scene. Generally, a model or scene file specifies data structures such as scene graphs to define the spatial and/or logical representation of a graphic scene.

On the other hand, elements that do not meet the pre-configured set of one or more priority conditions are included in a second set of one or more interface elements to be rendered at a priority that does not exceed the priority at which the first set of interface elements is rendered. Subsequently, the results of the rendering of the second set of interface elements are output to be displayed accordingly. Since both the first and second sets of interface elements are part of the overall target UI, the rendering results thereof are inter-related to a relatively high extent. Thus, with the rendering results of the first set and the second set being output at different times, an effect of visual augmentation is presented to a user, eliminating the flickering effect in the rendering of the UI as described above. As such, the rendering effects are enhanced and corresponding user experiences with UIs are improved.

Further, the rendering of the first set and the second set may be executed in parallel by using multithreading or other parallel operations, so as to achieve concurrent rendering. As a result, the rendering speed and rendering efficiency can be further increased, contributing to a more responsive launch screen when a target UI is the launch screen of an application, even though some portion of the rendering of the entire target UI remains in progress.

The UI associated with an application typically includes a multitude of interface elements. As used herein, the term "interface element" or "element" refers to a component or a group of components of a user interface. For example, an interface element can include a button, a title bar, a toolbar, a selection box, a switch, a slider, a progress bar, an input box, a check box, radio buttons, a navigation image such as a scroll arrow, a status icon, an animation, a toast, any other interface component that can achieve a predetermined display effect, a picture, an audio/video clip, a document, or any other appropriate interface component that can achieve a predetermined display effect with a picture configured as a background image. All of the interface elements of the UI of an application need to be drawn, rendered, or painted in order to properly present the UI to a user.

For example, a target UI can be a launch screen of the WeChat® application executing on a smart phone. In some embodiments, the launch screen includes a ListView control, which in turn includes a plurality of WeChat® chat entries (e.g., chat histories between various parties). Even though a relatively large amount of time is needed to render the entire launch screen UI with all the chats displayed, the element of ListView listing no items can be rendered relatively quickly, for example, more quickly than rendering a static image in its place. Therefore, the element of ListView is designated to be included in the first set of interface elements as meeting the priority conditions that qualify elements for the first set for being part of the layout of the target UI. This way, by rendering an empty ListView control first with priority, not only is the rendering speed increased, but content more relevant to the launch screen (target UI) is rendered and presented to a user.

In some embodiments, in addition to the afore-described priority rendering of the first set of interface elements for a target UI, during the process of priority rendering of, or after the process of priority rendering of the first set of interface elements, a second set of interface elements of the target UI including elements that do not meet the pre-configured set of one or more priority conditions is rendered for outputting. Again, as the first set and second set of interface elements are both elements of the same target UI, the rendering results thereof are inter-related to a relatively high extent. Thus, with the rendering results of the first set and the second set being output at different times, an effect of visual augmentation is presented to a user, eliminating the flickering effect in the rendering of the UI as described above. As such, the rendering effects are enhanced and corresponding user experiences with UIs are improved.

Taking the WeChat® launch screen for example again, an empty ListView is rendered and output first for presentation to the user who starts the WeChat® App. Then, various chat entries are rendered to populate the ListView control for presentation to the user. Thus, a smoother user experience is presented despite the size of chat data for display.

FIG. 1 illustrates an example computing system for rendering interface elements in accordance with an embodiment of the present disclosure. System 100 includes a server 102 and a plurality of clients 104. In some embodiments, clients 104 and server 102 are in data communication with each other via networks such as a wired network, wireless network, etc. In some embodiments, clients 104 and server 102 are executing on the same terminal device (e.g., smart phone, etc.), and communicate via inter-process communication (IPC) protocols. In some embodiments, clients 104 and server 102 are executing in the same process on a terminal device, and communicate via inter-thread communication protocols. For example, when server 102 is configured at a rendering main thread for an application or a rendering engine main thread for applications, clients 104 can be configured at a graphical user interface (GUI) thread of an application. It should be understood that any suitable techniques can be applied herein to the data communication between server 102 and clients 104, without limitation.

According to various embodiments of the present disclosure, the afore-mentioned terminal device includes, for example, a smart phone, a tablet computer, an e-book reader, an MP3 (Moving Picture Experts Group Audio Layer III) player, an MP4 (Moving Picture Experts Group Audio Layer IV) player, a laptop computer, an in-vehicle device, a desktop computer, a set-top box, a smart TV, a wearable device, an IoT device, and the like.

In this example, clients 104 are configured to transmit a processing request to server 102, the processing request including target UI information. In some embodiments, the target UI information includes address information of the target UI.

In this example, server 102 is configured to obtain the interface elements associated with the target UI based on the received address information of the target UI.

Server 102 is also configured to select a first set of one or more interface elements from the obtained interface elements to include the interface elements that meet the one or more pre-configured priority conditions. Details of the priority conditions are described below.

Afterwards, server 102 is configured to render the elements of the first set of one or more interface elements first, the result of which is output to clients 104 immediately upon completion. For example, when the first set of interface elements includes multiple interface elements, the rendering result of each element is output immediately upon completion.

Subsequently, server 102 is configured to identity a second set of interface elements from the collection of elements associated with the target UI. Elements in the second set of interface elements are those remaining ones that do not meet the afore-described pre-configured one or more priority conditions. Then, server 102 is configured to render the elements of the second set of interface elements, the result of which is similarly output upon completion.

Figure 2A:
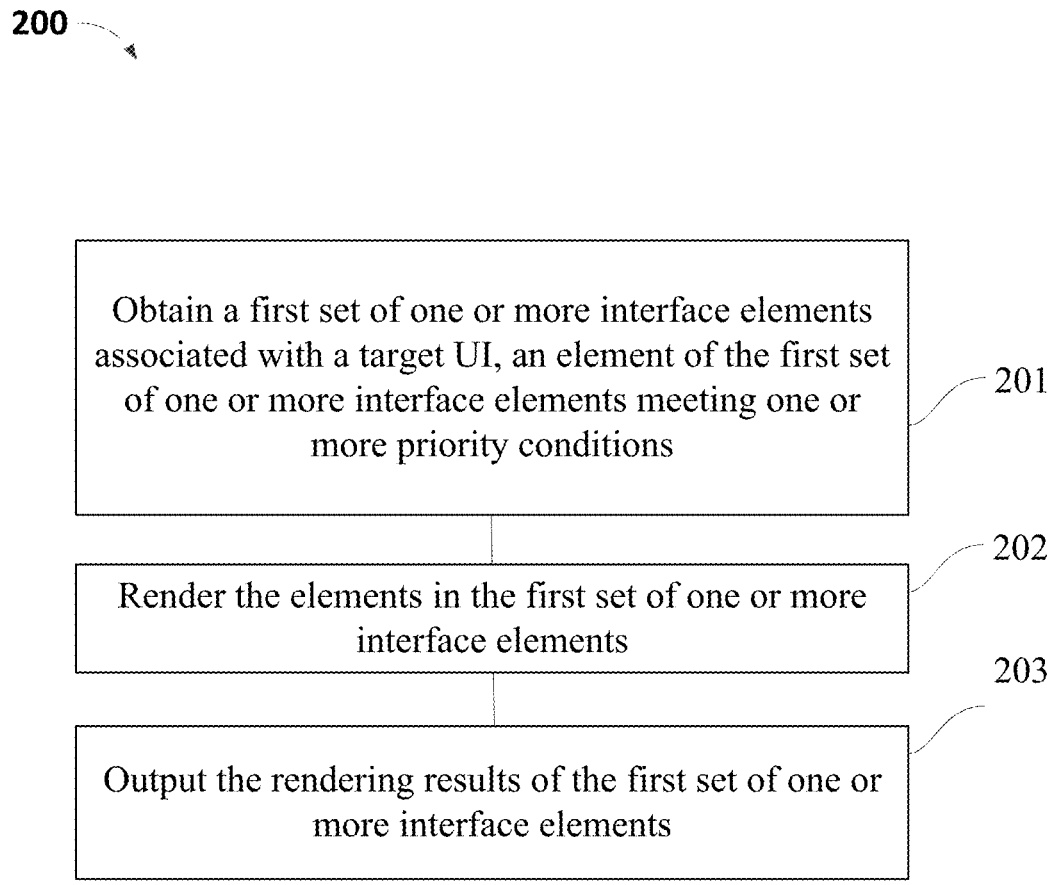
FIG. 2A is a flow chart illustrating an example process for rendering interface elements, in accordance with one or more embodiments of the present disclosure.

FIG. 2A illustrates a flow chart of an example process for rendering interface elements in accordance with an embodiment of the present disclosure. Process 200 can be implemented at, for example, server 102 of FIG. 1, device 800 of FIG. 8, or system 900 of FIG. 9.

Process 200 starts at 201, where a first set of one or more interface elements associated with a target UI to be rendered is obtained. Elements in the first set of one or more interface elements meet a set of pre-configured one or more priority conditions. A priority condition is configured to indicate the condition which qualifies an interface element as the type that can be rendered with priority over other interface elements. For simplicity of illustration, only two levels of priority are described with reference to the first set and second set of interface elements. It should be understood that the rendering priority can be multiple-tiered such that multiple sets of interface elements associated with one target UI can be rendered duly according to their respective varying rendering priority. It should also be understood that a rendering priority may further include sub-priority conditions such that the elements qualified for the same rendering priority can be further grouped into sub-sets to indicate more precise rendering priorities. More details of the set of one or more priority conditions are described in below.

In some embodiments, the target UI can be a launch screen UI that is displayed when an application is launched, or a transition UI of the application when the application is operated to navigate from one state to another state.

In some embodiments, the first set of interface elements associated with a target UI includes a set of one or more interface elements that are part of the layout configured for the target UI. For example, the first set of interface elements can include a layout container element (e.g., ListView control, GridView control, etc.), or the like. In some embodiments, the second set of interface elements associated with a target UI includes a set of one or more content to be displayed in the context of the one or more layout elements of the target UI.

Figure 2B:
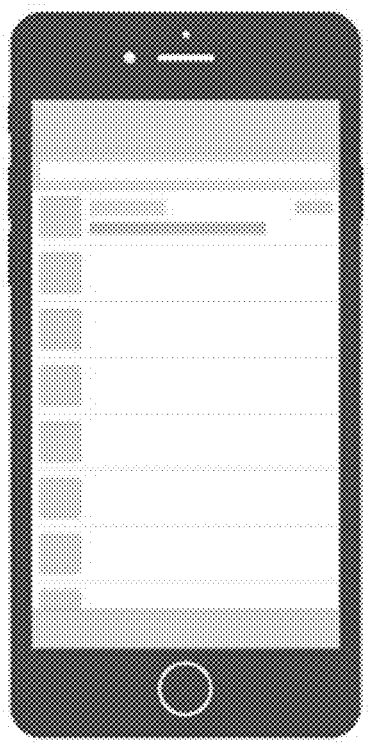
FIGS. 2B-2C are screenshots illustrating an example two-tiered priority rendering of a WeChat® launch screen, in accordance with one or more embodiments of the present disclosure.
Figure 2C:

Referring to FIGS. 2B-2C, which illustrate an example of rendering priority of a launch screen of WeChat® in accordance with an embodiment of the present disclosure. As shown herein, the above-described WeChat® program is illustrated as an example to describe a two tiered rendering shown by two example screenshots. In FIG. 2B, screenshot 252 shows an empty ListView control that is rendered with priority and first displayed to the user. In FIG. 2C, screenshot 254 shows the chat entries on various chatting threads (e.g., chat histories), which are part of the UI content to be rendered in association with the ListView element, rendered and presented to the user next. Here, the ListView control is determined to be included in the first set of interface elements for rendering with priority. Thus, the layout of the launch screen (e.g., the target UI) of the WeChat® program is presented to the user first, subsequently, the content associated with the ListView layout is presented to the user. With the order of presentation following the same order in which the user sees the launch screen, the visual effect of the rendering of the target UI (launch screen) is enhanced.

In some embodiments, the set of one or more pre-configured priority conditions includes layout conditions that indicate an element as part of the layout of a target UI. Three example mechanisms to obtain elements qualified for priority rendering under the layout conditions are illustrated in the following. It should be understood that any suitable techniques can be applied herein to identify elements that meet a layout condition, without limitation.

First, elements of the first set of interface elements can be obtained by invoking a call at a first pre-configured interface. For example, the first interface can be provided by the developers of the target UI such that the first set of interface elements can be obtained by, for example, an interface engine or the like, via a call to the first interface, e.g., a call to the interface of View.findviewById.

Second, interface elements can be designated with a pre-configured layout identifier indicating the respective elements as part of the layout configuration of the target UI. In some embodiments, the pre-configured identifier is specified for each of the elements of the target UI by the developers. Thus, based on the value of the identifier, a rendering engine or the like can be configured to determine whether an element is to be included in the first set of interface elements. For example, an element having a layout identifier of the value 1 indicates that the element is specified as part of the layout configuration of the target UI; while an element having a layout identifier of the value 0 indicates that the element is not specified as part of the layout configuration of the target UI. This information can be stored in a configuration file, layout code, or the like. In some embodiments, only those elements that are part of the layout of the target UI are designated with a layout identifier. In this case, elements of the first set of interface elements can be determined based on whether there is a layout identifier associated therewith. It should be understood that any suitable techniques are applicable herein to specify elements as part of the layout of a UI, without limitation.

Third, elements that are part of the layout of a target UI can be obtained based on the layout configuration file or layout code of the corresponding target UI. Here, the configuration file (e.g., a UI specifying XML, file) or the layout code associated with the target UI can be analyzed to identify the one or more elements that are part of the layout specified for the target UI. In some embodiments, descriptive information associated with the layout of the target UI is specified in a configuration file and/or layout coding associated with the target UI. For example, such descriptive information can include IDs associated with all the layout elements as well as their respective layout parameters (e.g., size, position, color, etc.). As such, one example way to obtain elements that qualify under the layout condition for the first set of interface elements is to obtain the elements with IDs matching the IDs specified in the configuration file or layout code for the layout elements. It should be understood that any suitable techniques to identify layout elements can be applied herein without limitation.

In some embodiments, the one or more priority conditions include user affinity conditions. User affinity conditions can be determined based on user data in connection with the user's access to and/or interaction with a target UI. In some embodiments, a user affinity condition can be configured based on user behaviors such as the favorite items designation by the user, and/or the user's habitual behavior in the interaction with the target UI such as a tendency to select a particular item in the UI. For example, the favorites selected by the user and the habitual behavior of the user can both be obtained by analyzing or mining the historical data pertaining to the user's interaction with the application associated with the target UI. In some embodiments, such historical or habitual data can be collected from a group of users, which may or may not include the particular user that is to interact with the same target UI. In other words, user affinity conditions can be specified based on other's affinity patterns to elements of the target UI of the same application.

Taking the WeChat® program for example again, typically the launch screen is presented to the user in the form of a list of chats from various parties or groups. Oftentimes, the user tends to chat with one or more parties at a higher frequency or in a very responsive manner. Therefore, one user affinity condition can be specified in terms of the factors such as the closeness of the relationship between the user and the chatting contact (e.g., family members, etc.), the historical frequency that the user and the chatting contact exchange chats, etc. For example, those contacts who have the closet relationship with the user (e.g., immediate family members) are determined as the target contacts or the priority contacts, and the content (e.g., chats) associated with those contacts is designated as elements meeting the user affinity condition and is included in the first set of interface elements.

Take the website of TaoBao® for another example, typically the launch page of the website displays popular widgets such as "scan," "search box," and "group shopping discount." If it is detected that in the recent past period of time, the user frequently clicks into the "group shopping discount" widget upon logging onto the TaoBao® website, the elements associated with the "group shopping discount" widget are designated as the elements of the first set of interface elements for priority rendering. After a period of time when it is detected that the user no longer open the "group shopping discount" widget upon logging onto the TaoBao® account on the website, but the user tends to use the search box a lot to compare items offered by various on-line merchants, the "group shopping discount" widget will be removed from the first set of interface elements, and the "search" widget will be included in the first set of interface elements as the elements to be rendered with high priority.

It should be understood that any interface elements can be designated to be included in the first set of interface elements based on the user behavior data or contextual data. In some embodiments, the user affinity condition can include a geo-location of the user. For example, a user of the WeChat® program is on WeChat® with contacts in both country A and country B even though most of the time the user lives in country A. When the user travels to country B, in addition to those above-described target contacts, the contacts who live in country B can be temporarily designated as target contacts so that chats from them are rendered with high priority, as the user is probably more interested to communicate with them while in country B.

In some embodiments, the set of one or more pre-configured priority conditions includes user affinity conditions. Two example mechanisms to obtain elements qualified for priority rendering under the user affinity conditions are illustrated in the following. It should be understood that any suitable techniques can be applied herein to identify elements that meet user affinity conditions, without limitation.

First, elements of the first set of interface elements can be obtained by invoking a call at a second pre-configured interface. For example, the second interface can be provided by the developers of the target UI such that the first set of interface elements can be obtained by, for example, an interface engine or the like, via a call to the second interface.

Second, elements qualifying under the user affinity condition can be designated with a user affinity identifier. Therefore, based on the data associated with the target UI, the elements associated with such an identifier are obtained as the elements to be included in the first set of interface elements. The user affinity identifier can be pre-configured by the developers of the target UI, and/or updated based on ongoing user behaviors towards the target UI. For example, a user affinity identifier can be statically associated with contacts in WeChat® who are the immediate family members as indicated by the user. On the other hand, a user affinity identifier can also be dynamically assigned to interface elements. In implementing the latter case, the developers of the target UI can program a user selection counter to be associated with an interface element of the target UI to track the user behavioral interaction therewith. Once the count recorded by the counter exceeds a threshold, the user affinity identifier can be assigned to such element. By identifying elements associated with the user affinity identifier, the rendering engine or the like can determine the first set of interface elements for priority rendering. It should be understood that any suitable techniques for determining elements under user affinity conditions can be applied herein without limitation.

In some embodiments, the set of priority conditions includes a background color condition and/or a background condition, indicating that one or more elements associated with the target UI for presenting the background color or the background are rendered with priority. As a result, interface elements associated with either a background color or a background can be determined as the elements to be included in the first set of interface elements for priority rendering. For example, a colored background can be rendered first and output to be presented to the user immediately. Similarly, a background image can be rendered first and output to be displayed to the user immediately.

For simplicity of illustration, only a few example types of priority conditions are described in the above embodiments. It should be understood that any suitable techniques can be applied to identify elements for priority rendering to contribute to a smooth and intuitive visual effect for the UI rendering. For example, those interface elements associated with a data structure of a size smaller than a threshold level can be included in the first set of interface elements since it is relatively faster to have those smaller-footprinted elements rendered first. As a result, the rendering of a UI gives rise to a more responsive visual effect even though other interface elements remain in the process of being rendered. For another example, those interface elements that are presented in the earlier part of a visual pathway (e.g., the top section of a screen of a mobile device, etc.) can be included in the first set of interface elements since the user tends to see those elements before seeing other elements in the same target UI. As a result, the rendering of a UI gives rise to a more intuitive visual presentation which synchronizes the order of the content display with the order of the visual pathway.

Referring back to FIG. 2A, in implementations, at 201 where the obtaining of the first set of interface elements associated with the target UI to be rendered includes loading the interface elements of the target UI. Subsequently, it is determined whether the loaded element meets the set of one or more priority conditions. When it is determined that the loaded element meets the set of one or more priority conditions, the loaded element is determined to be included in the first set of interface elements.

At 202, the elements in the determined first set of interface elements associated with the target UI are rendered. For example, attributes, such as the geometry information, texture, shading, coloring, etc., pertaining to a ListView control, a widget, or the like associated with the target UI can be generated first to render these graphic scenes of a partial target UI.

In some embodiments, when the rendering of an element in the first set of interface elements can be performed by a plurality of sub-rendering tasks, the rendering is in turn broken into a plurality of sub-rendering tasks, which are executed by multithreading. As such, the speed and responsiveness of the rendering of the elements in the first set of interface elements can be further increased.

Further, when there are multiple elements included in the first set of interface elements, not only the above-described sub-rendering can be performed for an individual element, but also each element in the first set of interface elements can be rendered by use of multi-threading in an asynchronous manner. Similarly, as a result, the speed and responsiveness of the rendering of the elements in the first set of interface elements can be further increased.

It should be understood that any suitable techniques can be applied herein to render the elements of the determined first set of interface elements without limitations.

At 203, the rendering results of the first set of interface elements are outputted.

In some embodiments, when a server is configured to render UIs for applications executing on a client, the server is configured to output the rendering results to the client such that the rendering results are presented to the user at the client on a terminal device. In some other embodiments, when a rendering engine of a client is configured to render UIs for applications executing on the client, the rendering engine is configured to output the rendering results for display at the client directly. It should be understood that any suitable techniques can be applied herein to output the rendering results of the elements of the determined first set of interface elements without limitations.

In sum, a first set of one or more interface elements including elements that meet a set of one or more priority conditions are rendered with priority. As part of the target UI, the rendering of the elements of the first set of interface elements and entire target UI is inter-related to a relatively high extent. Thus, with the rendering results of the first set being output immediately, the rendering effects are enhanced and corresponding user experiences with UIs are improved.

Figure 3:
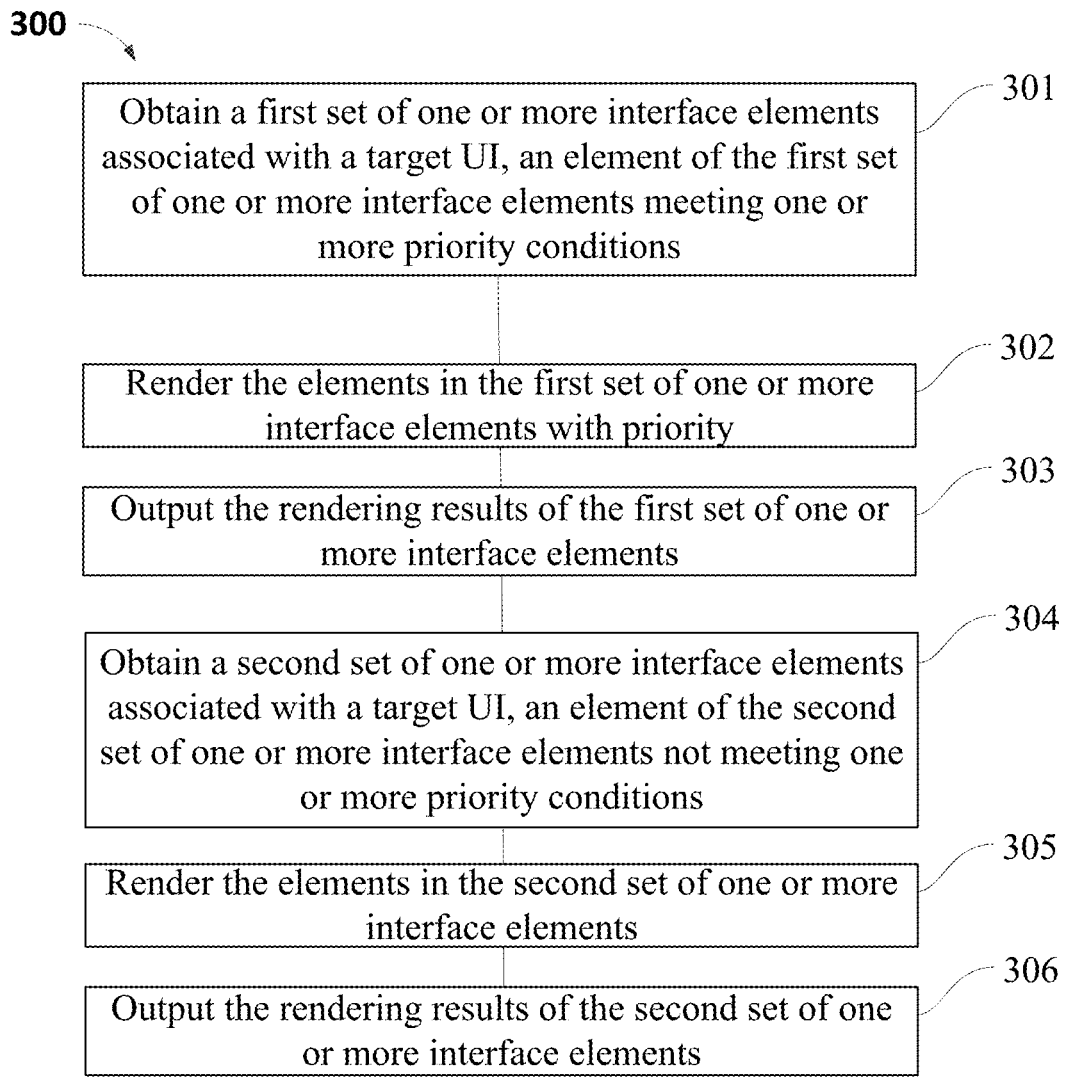
FIG. 3 is a flow chart illustrating another example process for rendering interface elements, in accordance with one or more embodiments of the present disclosure.

FIG. 3 illustrates a flow chart of another example process for rendering interface elements in accordance with an embodiment of the present disclosure. Process 300 can be implemented by, for example, server 102 of FIG. 1, device 800 of FIG. 8, or system 900 of FIG. 9.

Process 300 starts at 301, where interface elements that meet a set of one or more priority conditions are determined to be included in a first set of interface elements associated with a target UI to be rendered.

At 302, the elements in the determined first set of interface elements are rendered with priority.

At 303, the rendering results of the elements of the first set of interface elements are outputted to be displayed.

At 304, interface elements that don't meet the set of one or more priority conditions are determined to be included in a second set of interface elements associated with the target UI to be rendered.

At 305, the elements in the determined second set of interface elements are rendered.

At 306, the rendering results of the elements of the second set of interface elements are outputted.

In implementations, step 305 can be performed along with step 302, or subsequent to step 302. In the case where the elements of the second set of interface elements are rendered during the rendering of the elements of the first set of interface elements, threads independent from the threads performing the rendering of the elements of the first set of interface elements can be utilized. As a result, the speed and responsiveness of rendering all the elements associated with the target UI can be further increased.

In some embodiments, the elements of the second set of interface elements are rendered in an asynchronous manner. Compared to the conventional synchronous rendering, the asynchronous rendering of the elements of the second set of interface elements further contributes to the independent rendering of elements of the second set of interface elements, as a result of enhanced rendering efficiency can be achieved.

Since both the first and second sets of interface elements are part of the overall target UI, the rendering results thereof are inter-related to a relatively high extent (e.g., configured with physical proximity to each other as one widget next to another widget, or logical proximity to each other as container element and content element included by the container element). Thus, with the rendering results of the first set and the second set being output at different times, an effect of visual augmentation is presented to a user, eliminating the flickering effect in the rendering of the UI as described above. As such, the rendering effects are enhanced and corresponding user experiences with UIs are improved.

In implementations, the elements of a target UI to be rendered are loaded first. After each loading of an element, it is determined whether the loaded element meets a set of one or more priority conditions. When a loaded element meets the set of one or more priority conditions, the loaded element is included in the first set of interface elements for priority rendering. When a loaded element does not meet the set of one or more priority conditions, the loaded element is included in the second set of interface elements for rendering. The rendering of the elements in the first set of interface elements is independent from the rendering of the elements of the second set of interface elements. In some embodiments, the rendering of the elements in the first set of interface elements is performed before the rendering of the elements of the second set of interface elements.

Here, the rendering of the second set of interface elements being independent from the rendering of the first set of interface elements can be implemented by performing the rendering of the first set and the second set of interface elements in an asynchronous manner. Thus, the speed and responsiveness of rendering the elements associated with the target UI can be further increased. Alternatively, the rendering of the first set and the second set of interface elements can be performed in a synchronous manner, with the rendering of the first set of interface elements performed before the rendering of the second set of interface elements. For example, the elements of the first set of interface elements are rendered first, and the rendering of the elements of the second set of interface elements starts upon the completion of the rendering of the first set of interface elements.

In some embodiments, the rendering of the elements of the second set of interface elements associated with a target UI includes configuring or enlisting the rendering tasks corresponding to individual elements into a queue of rendering tasks, which are executed by use of multithreading. Thus, the rendering tasks in the queue are executed concurrently, resulting in increased speed and efficiency of UI rendering.

Figure 4:
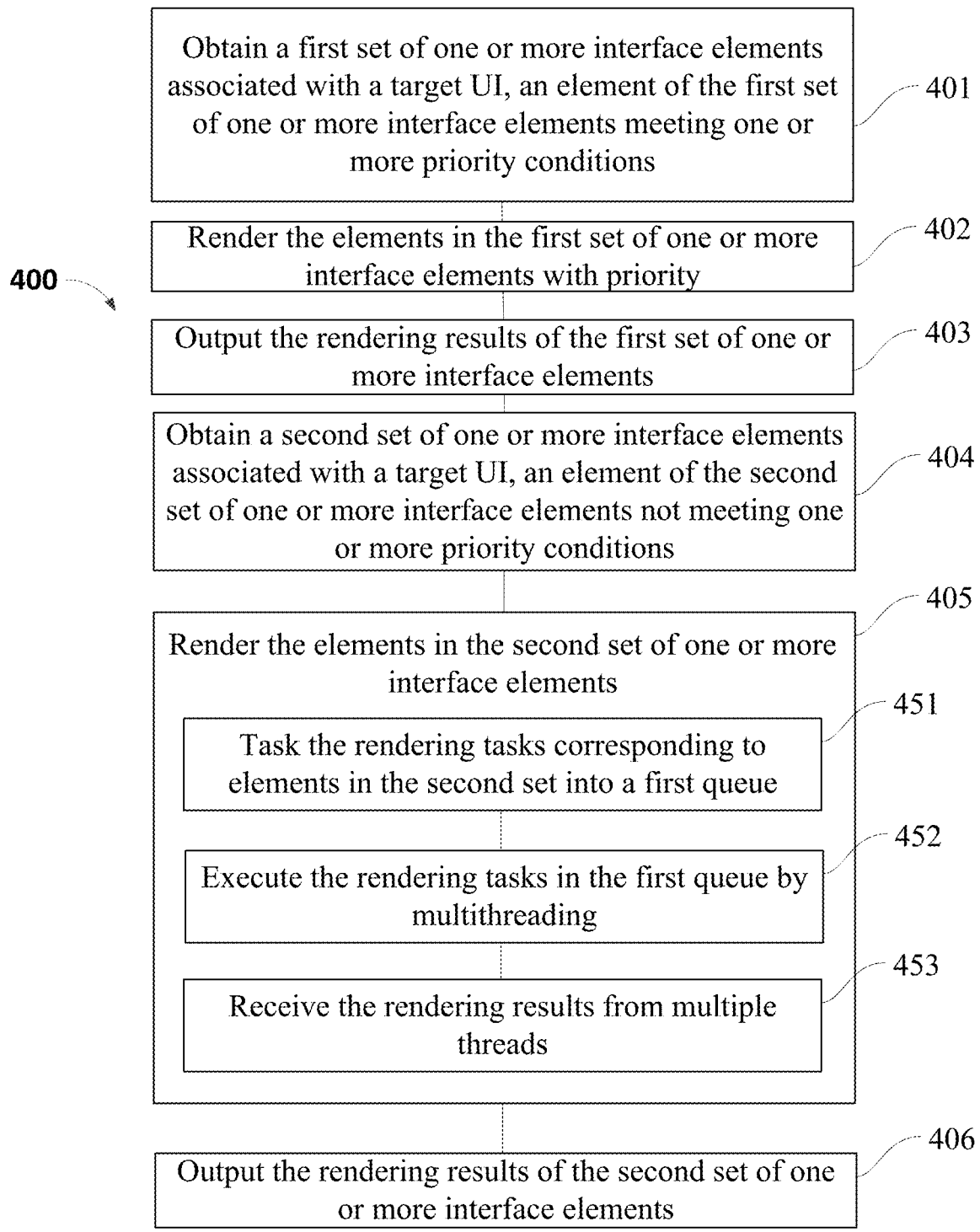
FIG. 4 is a flow chart illustrating yet another example process for rendering interface elements, in accordance with one or more embodiments of the present disclosure.

FIG. 4 illustrates a flow chart of yet another example process for rendering interface elements in accordance with an embodiment of the present disclosure. Process 400 can be implemented by, for example, server 102 of FIG. 1, device 800 of FIG. 8, or system 900 of FIG. 9.

Process 400 starts at 401, where interface elements that meet a set of one or more priority conditions are determined to be included in a first set of interface elements associated with a target UI to be rendered.

At 402, the elements in the determined first set of interface elements are rendered with priority.

At 403, the rendering results of the elements of the first set of interface elements are outputted.

At 404, interface elements that don't meet the set of one or more priority conditions are determined to be included in a second set of interface elements associated with the target UI to be rendered.

At 405, the elements in the determined second set of interface elements are rendered.

At 406, the rendering results of the elements of the second set of interface elements are outputted.

Here, step 405 further comprises steps 451 through 453, which are described below.

At 451, the rendering tasks corresponding to respective elements in the second set of interface elements are added into a first queue for execution.

At 452, the rendering tasks in the first queue are executed by use of multithreading.

At 453, the rendering results are received from multiple threads.

With the conventional rendering techniques, the interface elements of a target UI are rendered one by one following the order specified by the developers of the target UI. In particular, one element is rendered first, upon the completion of which the other element is to be render, and so on. Thus, when the rendering of an element involves a large amount of data, the rendering of the other elements specified to be rendered after this particular element is performed with a relatively long delay. As such, the overall rendering speed of the entire target UI is negatively impacted.

However, with the use of multithreading to execute the rendering tasks in the first queue, both the rendering speed and the rendering efficiency can be improved due to the concurrent processing provided by multithreading mechanisms. In the scenario where the target UI is the launch screen of an application, the starting-up time of the application can be shortened greatly.

In some embodiments, step 452 can further include sub-steps, which are described below.

First, when any thread is idle, the first queue is scanned to identify for new rendering tasks to be performed.

Next, when a new rendering task is identified upon such scanning, the new rendering task is removed from the queue and executed in turn.

In some embodiments, as the idling threads can be configured to de-queue rendering tasks for execution without particular limitations, such rendering over multithreading mechanisms can achieve execution of the rendering tasks in a preemptive and continuous manner, which contributes to enhancing the rendering efficiency to a great extent. In some other embodiments, the rendering of the elements in the second set of interface elements by use of multithreading can be performed by designating threads according to the order in which the individual rendering tasks are to be performed. It should be understood that any suitable techniques can be applied to executing the rendering tasks in the first queue by use of multithreading mechanisms without limitation.

Figure 5:
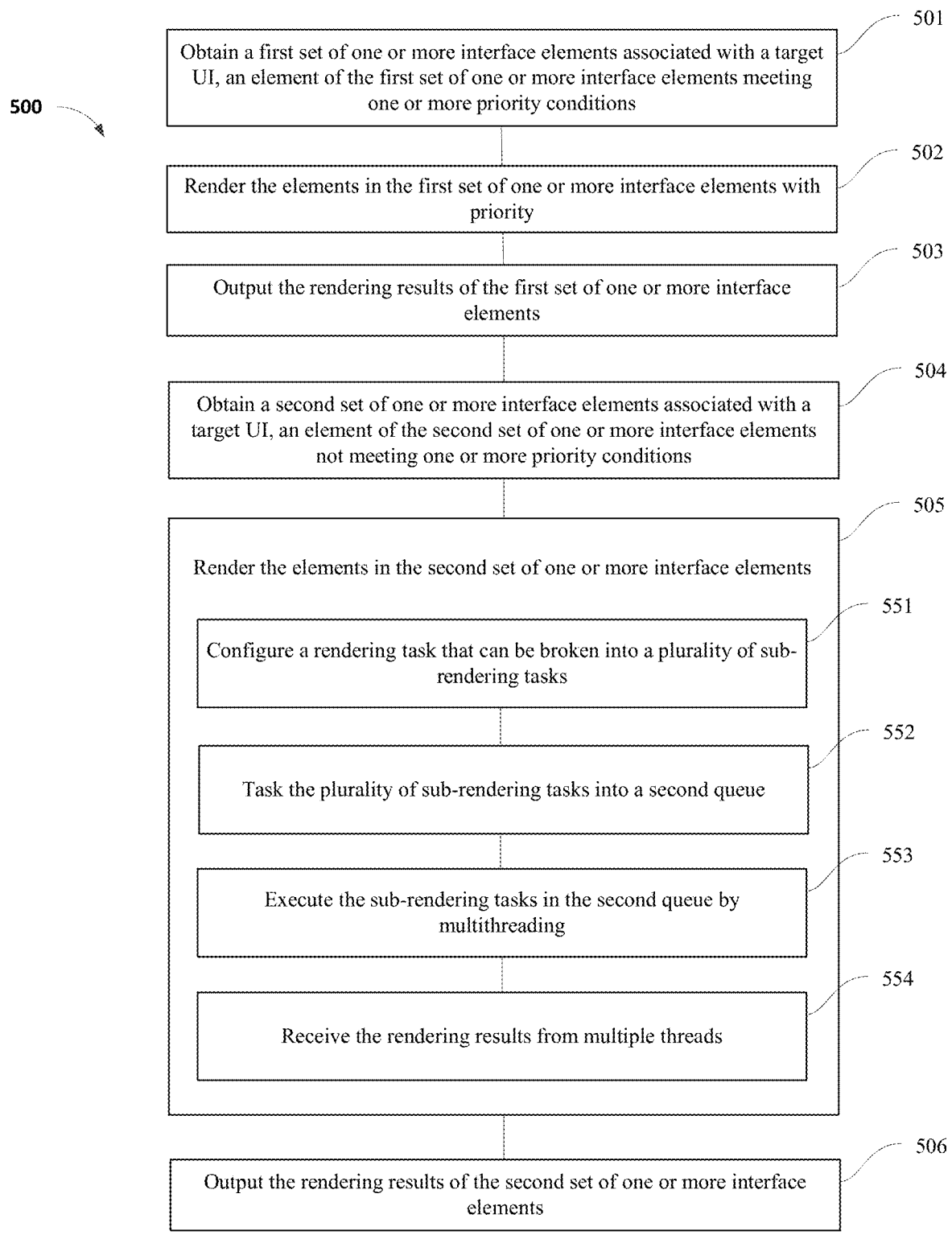
FIG. 5 is a flow chart illustrating yet another example process for rendering interface elements, in accordance with one or more embodiments of the present disclosure.

FIG. 5 illustrates a flow chart of yet another example process for rendering interface elements in accordance with an embodiment of the present disclosure. Process 500 can be implemented by, for example, server 102 of FIG. 1, device 800 of FIG. 8, or system 900 of FIG. 9.

Process 500 starts at 501, where interface elements that meet a set of one or more priority conditions are determined to be included in a first set of interface elements associated with a target UI to be rendered.

At 502, the elements in the determined first set of interface elements are rendered with priority.

At 503, the rendering results of the elements of the first set of interface elements are outputted.

At 504, interface elements that don't meet the set of one or more priority conditions are determined to be included in a second set of interface elements associated with the target UI to be rendered.

At 505, the elements in the determined second set of interface elements are rendered.

At 506, the rendering results of the elements of the second set of interface elements are outputted.

Here, step 505 further comprises steps 551 through 554, which are described below.

At 551, when the rendering task of an element of the second set of interface elements can be accomplished by performing a plurality of sub-rendering tasks, the rendering of such element is configured into such plurality of sub-rendering tasks.

At 552, the above-described plurality of sub-rendering tasks are added to a queue for processing.

At 553, the sub-rendering tasks in the queue are executed by use of multithreading.

At 554, the rendering results from the sub-rendering tasks are received from multiple threads.

As such, for the rendering of those elements that can be accomplished by performing one or more sub-rendering tasks, the rendering speed can be further increased in particular.

In some embodiments, example rendering tasks that can be configured via performing a plurality of sub-rendering tasks include the rendering of picture elements, video elements, document elements, and the like. Taking the rendering of a picture element for example, the overall task can be configured to include retrieving the data associated with the picture from a data storage into the memory, decoding the image data, and generating textural content associated with the picture based on the decoding result. Here, the decoding of the image data can be further configured into sub-tasks.

In some embodiments, step 553 can further include sub-steps, which are described below.

First, when any thread is idle, the queue is scanned to identify new sub-rendering tasks to be performed.

Next, when a new sub-rendering task is identified upon such scanning, the new sub-rendering task is removed from the queue and executed in turn.

In some embodiments, as the idling threads can be configured to de-queue sub-rendering tasks for execution without particular limitations, such rendering over multithreading mechanisms can achieve execution of the sub-rendering tasks in a preemptive and continuous manner, which contributes to enhancing the rendering efficiency to a great extent. In some other embodiments, the rendering of the elements in the second set of interface elements by use of multithreading can be performed by designating threads according to the order in which the individual sub-rendering tasks are to be performed. It should be understood that any suitable techniques can be applied to executing the sub-rendering tasks in the queue by use of multithreading mechanisms without limitation.

Figure 6:
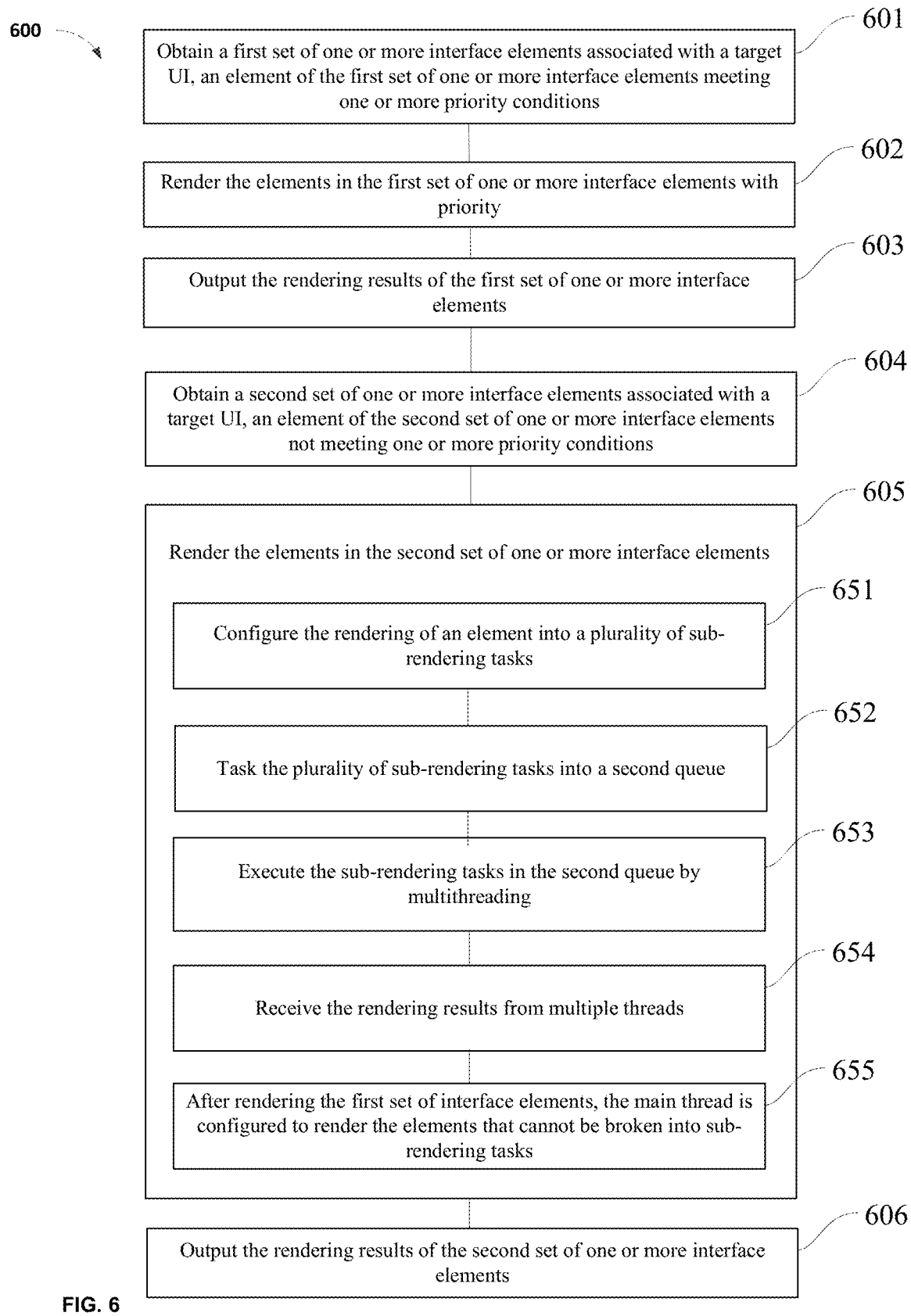
FIG. 6 is a flow chart illustrating yet another example process for rendering interface elements, in accordance with one or more embodiments of the present disclosure.

FIG. 6 illustrates a flow chart of another example process for rendering interface elements in accordance with an embodiment of the present disclosure. Process 600 can be implemented by, for example, server 102 of FIG. 1, device 800 of FIG. 8, or system 900 of FIG. 9.

Process 600 starts at 601, where interface elements that meet a set of one or more priority conditions are determined by a main thread to be included in a first set of interface elements associated with a target UI to be rendered.

At 602, the elements in the determined first set of interface elements are rendered with priority by the main thread.

At 603, the rendering results of the elements of the first set of interface elements are outputted by the main thread.

At 604, interface elements that don't meet the set of one or more priority conditions are determined by the main thread to be included in a second set of interface elements associated with the target UI to be rendered.

At 605, the elements in the determined second set of interface elements are rendered by the main thread.

At 606, the rendering results of the elements of the second set of interface elements are outputted by the main thread.

Here, step 605 further comprises steps 651 through 655, which are described below.

At 651, when the rendering of an element of the second set of interface elements can be accomplished by performing a plurality of sub-rendering, the rendering of such element is configured into a plurality of sub-tasks by the main thread.

At 652, the above-described plurality of sub-tasks are added to a queue for processing by the main thread.

At 653, the rendering sub-tasks in the queue are executed in a multithreading manner by the main thread.

At 654, the rendering results from the sub-rendering tasks are received by the main thread.

At 655, after the rendering of the first set of interface elements, the main thread is configured to perform these rendering tasks that cannot be broken into sub-rendering tasks.

Compared to process 500, process 600 is performed by a main thread so that not only is the main thread configured to execute step 602, in which the first set of interface elements are rendered with priority, but also the main thread is configured to generate sub-tasks, which are executed by other multiple threads. Further, by performing the rendering tasks that cannot be broken into sub-rendering tasks subsequent to completing the rendering of the second set of interface elements, the main thread is configured to avoid staying idle, further conserving the computing resources, increasing the usage efficiency and the rendering efficiency.

In some implementations, the main thread can be configured as the thread responsible for rendering UIs. For example, the main thread can be the rendering engine's main thread. Other multiple threads can be configured as those sub-threads started by the main thread for executing of the sub-rendering tasks. It should be understood that any suitable techniques can be applied to implement the main thread and its multiple sub-threads.

Figure 7:
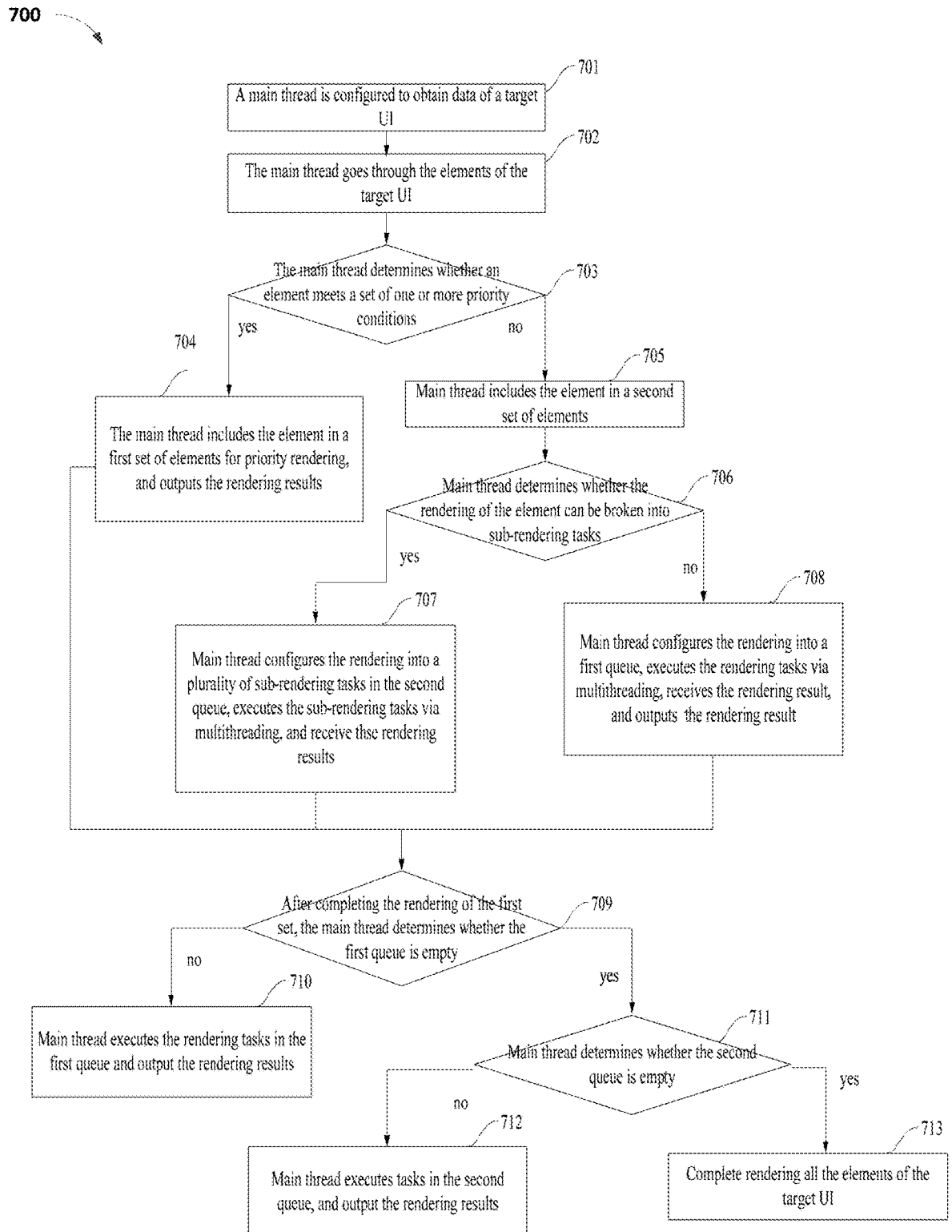
FIG. 7 is a flow chart illustrating yet another example process for rendering interface elements, in accordance with one or more embodiments of the present disclosure.

FIG. 7 illustrates a flow chart of an example process for rendering interface elements in accordance with an embodiment of the present disclosure. Process 700 can be implemented by, for example, device 800 of FIG. 8, or system 900 of FIG. 9.

Process 700 starts at 701, where a main thread is configured to obtain data associated with a target UI.

At 702, the main thread is configured to go through the interface elements associated with the target UI one by one based on the obtained data.

At 703, the main thread is configured to determine whether an element meets a set of one or more pre-configured priority conditions. If so, process 700 continues to 704; otherwise, process 700 continues to 705.

At 704, the main thread is configured to include the element that meets the set of one or more priority conditions in a first set of interface elements associated with the target UI. Afterwards, the main thread is configured to render the first set of interface elements with priority, the result of which is outputted for display.

At 705, the main thread is configured to include the element that does not meet the set of one or more priority conditions in a second set of interface elements associated with the target UI.

At 706, the main thread is configured to determine whether any of the rendering tasks corresponding to the elements in the second set of interface elements can be broken into sub-rendering tasks. For example, an imaging decoding operation can be broken into sub-tasks including the rendering of the attributes of texture, mesh, audio/video components, etc. If so, process 700 continues to 707; otherwise, process 700 continues to 708.

At 707, the main thread is configured to break the rendering of those elements into multiple sub-rendering tasks, which are in turn added to a second queue. By use of multithreading, the main thread is configured to start multiple sub-threads to de-queue the sub-rendering tasks from the second queue for execution. The main thread is also configured to receive the sub-rendering results from those sub-threads.

At 708, the main thread is configured to task the rendering of those elements into a first queue. Again, by use of multithreading, the main thread is configured to start other multiple sub-threads to de-queue the rendering tasks from the first queue for execution. The main thread is also configured to receive the rendering results from those sub-threads, and to output those rendering results.

It should be understood that, after the branched processing via steps 704/705 and 707/708, process 700 continues back to 703 to process the next element for rendering.

At 709, the main thread is configured to determine whether all the elements in the first queue of rendering tasks are exhausted upon the completion of the rendering of the first set of interface elements. If so, process 700 continues to 711, otherwise, process 700 continues to 710.

At 710, the main thread is configured to execute the rendering tasks of the first queue, and output the results thereof accordingly.

At 711, the main thread is configured to determine whether the second queue has been emptied for execution. If so, process 700 continues to 712; otherwise, process 700 continues to 713.

At 712, the main thread is configured to execute the sub-rendering tasks of the second queue, and output the results thereof accordingly.

At 713, the rendering of the interface elements in the target UI is complete.

Figure 8:
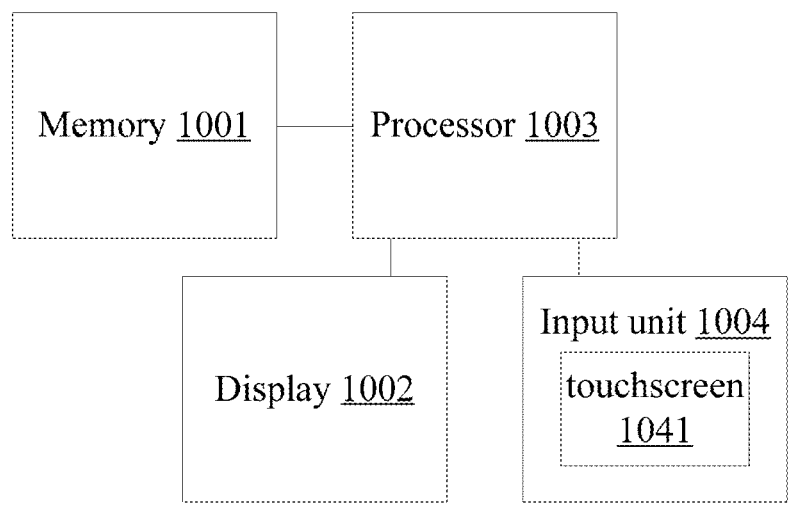
FIG. 8 is a block diagram illustrating an example device for rendering interface elements, in accordance with one or more embodiments of the present disclosure.

FIG. 8 illustrates a block diagram of an example device for rendering interface elements in accordance with an embodiment of the present disclosure. Device 800 includes a memory unit 1001, a display 1002, a processor 1003, and an input unit 1004.

Input unit 1004 is configured to receive numeric or character information entered by a user, and to control signals. For example, input unit 1004 includes a touchscreen 1041, which can be used to collect touch operations by the user thereon or in proximity thereof. Such, user operations can be performed by use of any suitable object such as the user's finger, or a stylus, etc. Input unit 1004 is configured to trigger corresponding programs via pre-configuration. Additionally, input unit 1004 can include other input equipment such as a keyboard, function keys (e.g., volume control keys, power buttons, etc.), and mouse devices.

Display 1002 can include a display panel, which can be a liquid crystal display (LCD) or organic light-emitting diode (OLED) display. Touchscreen 1041 can be configured to cover the display panel to form a touch display screen, which is configured to detect touch operations thereon or in proximity thereof. As a result, the detected touch operations are transmitted to processor 1003 for processing.

Processor 1003 is configured to retrieve from memory unit 1001 programs, instructions, modules, and/or data for processing. In some embodiments, processor 1003 is configured to receive triggering commands corresponding to target items under the pre-configured policies. In response to the triggering commands, processor 1003 is configured to provide the user with expanded content corresponding to the target items, where the expanded content is obtained from an application other than the input method.

The units described above can be implemented as software components executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The units may be implemented on a single device or distributed across multiple devices. The functions of the units may be merged into one another or further split into multiple sub-sub-units.

Figure 9:
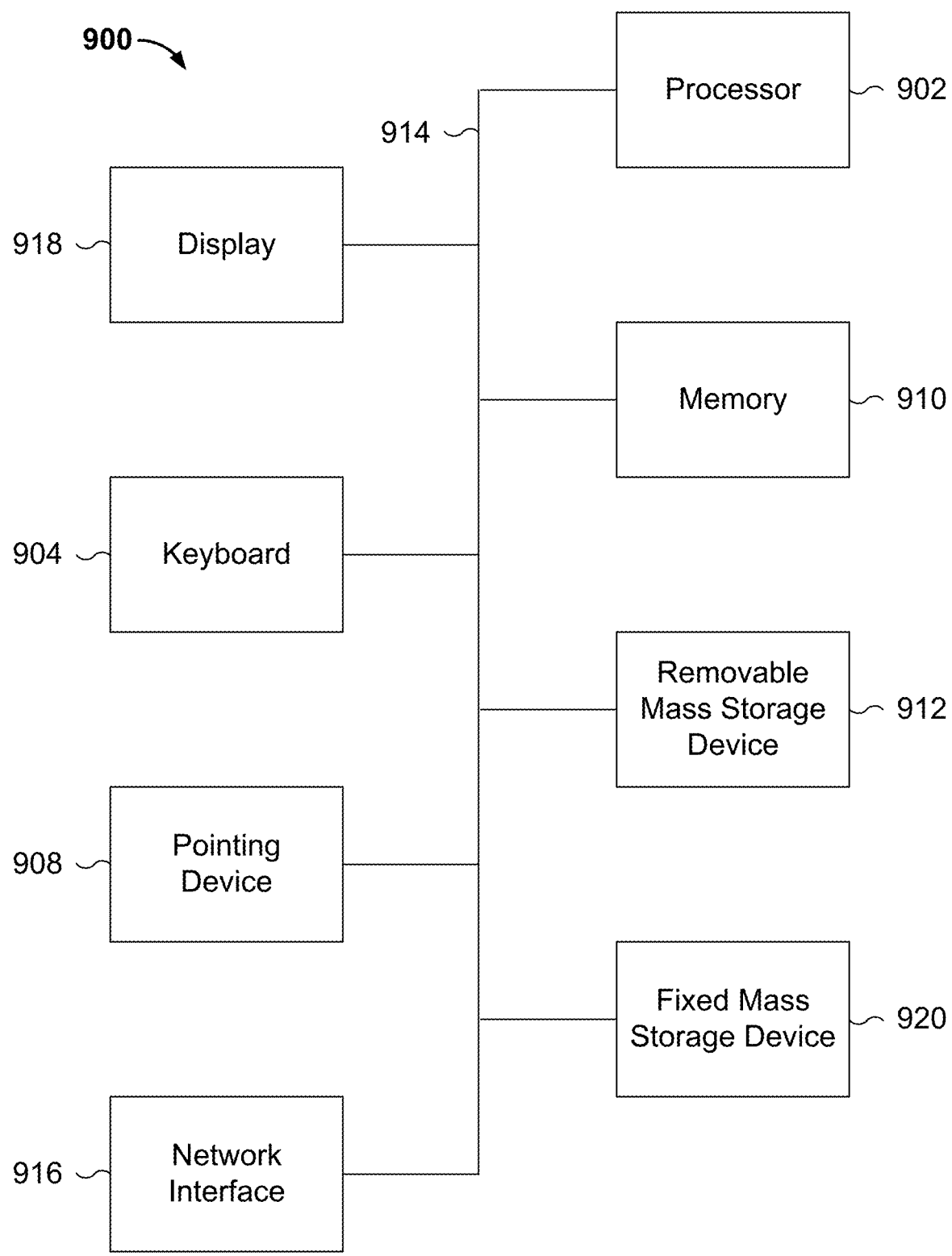
FIG. 9 is a functional diagram illustrating an embodiment of a programmed computer system for rendering interface elements, in accordance with one or more embodiments of the present disclosure.

FIG. 9 is a functional diagram illustrating an embodiment of a programmed computer system for rendering interface elements. As will be apparent, other computer system architectures and configurations can be used to render interface elements. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In some embodiments, processor 902 includes and/or is used to provide the launch of a client application based on a message.

Processor 902 is coupled bi-directionally with memory 910, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 902 to perform its functions (e.g., programmed instructions). For example, memory 910 can include any suitable computer readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computer system 900 and is coupled either bi-directionally (read/write) or uni-directionally (read only) to processor 902. For example, storage 912 can also include computer readable media such as magnetic tape, flash memory, PC-CARDS, portable mass storage devices, holographic storage devices, and other storage devices. A fixed mass storage 920 can also, for example, provide additional data storage capacity. The most common example of fixed mass storage 920 is a hard disk drive. Mass storage 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display 918, a network interface 916, a keyboard 904, and a pointing device 908, as well as an auxiliary input/output device interface, a sound card, speakers, and other subsystems as needed. For example, the pointing device 908 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers. Persons skilled in the art may clearly understand that, for the sake of descriptive convenience and streamlining, one may refer to the processes in the aforesaid method embodiments that correspond to specific work processes of the systems, devices, and units described above. They will not be discussed further here.

In one typical configuration, the computation equipment comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media, (transitory media), such as modulated data signals and carrier waves.

A person skilled in the art should understand that embodiments of the present application can be provided as methods, systems, or computer program products. Therefore, the present application can take the form of an entirely hardware embodiment, an entirely software embodiment, or an embodiment that combines software and hardware aspects. In addition, the present application can take the form of computer program products implemented on one or more computer-operable storage media (including but not limited to magnetic disk storage devices, CD-ROMs, and optical storage devices) containing computer operable program codes.

The present application is described with reference to flowcharts and/or block diagrams based on methods, devices (systems), and computer program products of embodiments of the present application. Please note that each process and/or block within the flowcharts and/or block diagrams and combinations of processes and/or blocks within the flowcharts and/or block diagrams can be realized by computer commands. These computer program instructions can be provided to general-purpose computers, special-purpose computers, embedded processors, or processors of other data-processing devices to give rise to a machine such that the instructions by the computers or by the processors of other programmable data-processing devices give rise to devices used to implement the functions specified in one or more processes in a flowchart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command devices. These command devices implement the functions specified in one or more processes in a flow chart and/or one or more blocks in a block diagram.

These computer program instructions can also be loaded onto a computer or other programmable data-processing device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

Although preferred embodiments of the present application have already been described, persons skilled in the art can make other alterations and modifications to these embodiments once they grasp the basic creative concept. Therefore, the attached claims are to be interpreted as including the preferred embodiments as well as all alterations and modifications falling within the scope of the present application.

Obviously, a person skilled in the art can modify and vary the present application without departing from the spirit and scope of the present application. Thus, if these modifications to and variations of embodiments of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   loading a plurality of interface elements associated with a target user interface (UI);
   determining, from among the plurality of interface elements, a first set of one or more interface elements and a second set of one or more interface elements, wherein:

at least one of the first set of one or more interface elements and the second set of one or more interface elements is determined based at least in part on a determination that respective interface elements of the plurality of interface element satisfy a pre-configured priority condition;

the determination that respective interface elements of the plurality of interface elements satisfy the pre-configured priority condition is based at least in part on whether a value of an identifier corresponding to the respective interface elements is indicative of the respective interface elements being part of a layout configuration of the target UI; and the value of the identifier corresponding to the respective interface elements is obtained from a configuration file or layout code for the target UI;

obtaining the first set of one or more interface elements associated with the target UI to be rendered;

rendering the first set of one or more interface elements at a higher priority than other interface elements associated with the target UI, wherein the first set of one or more interface elements are rendered concurrently with a second set of one or more interface elements, and the first set of one or more interface elements and the second set of one or more interface elements are rendered according to different priorities; and outputting a rendering result of the first set of one or more interface elements.

2. The method of claim 1, wherein the pre-configured priority condition comprises one or more of the following: a configuration condition related to a layout of the target UI, a user affinity condition, a background color condition, and/or a background condition.

3. The method of claim 2, wherein the configuration condition indicates that an interface element is part of the layout of the target UI, and the obtaining of the first set of one or more interface elements comprises:

obtaining an element meeting the configuration condition to be included in the first set of one or more interface elements by invoking a first pre-configured interface.

4. The method of claim 2, wherein, when the priority condition includes the user affinity condition, the obtaining of the first set of one or more interface elements includes:

obtaining an element meeting the user affinity condition to be included in the first set of one or more interface elements by invoking a pre-configured interface.

5. The method of claim 2, wherein, when the priority condition includes the user affinity condition, the obtaining of the first set of one or more interface elements includes:

obtaining, based on data associated with the target UI, the first set of one or more interface elements by determining whether an identifier associated with an element of the first set of one or more interface elements matches with a user affinity identifier.

6. The method of claim 2, wherein the priority condition includes the user affinity condition, and the user affinity condition comprises a condition determined based on operation habits of a user in relation to the target UI.

7. The method of claim 1, further comprising:

obtaining the second set of one or more interface elements associated with the target UI, the second set of one or more interface elements comprising one or more interface elements that do not meet the pre-configured priority condition, wherein rendering tasks for rendering the second set of one or more interface elements are added to a first queue;

rendering the second set of one or more interface elements; and outputting rendering results of the second set of one or more interface elements.

8. The method of claim 7, wherein the rendering of the second set of one or more interface elements comprises:

executing the rendering tasks in the first queue by multithreading; and receiving, from the multithreading, rendering results of the rendering tasks.

9. The method of claim 8, wherein the executing of the rendering tasks in the first queue by multithreading comprises:

scanning, when a thread is idle, the first queue to detect a new rendering task; and de-queuing from the first queue, when the new rendering task is detected, the new rendering task for execution.

10. The method of claim 7, wherein the rendering of the second set of one or more interface elements comprises:

breaking a rendering task corresponding to rendering an element of the second set of one or more interface elements into a plurality of sub-rendering tasks;

tasking the plurality of sub-rendering tasks to a second queue;

executing the plurality of sub-rendering tasks in the second queue by multiple threads; and receiving rendering results of the plurality of sub-rendering tasks from the multiple threads.

11. The method of claim 10, wherein the executing of the plurality of sub-rendering tasks in the second queue by multiple threads comprises:

scanning, when a thread is idle, the second queue to detect a new sub-rendering task; and, de-queuing from the second queue, when the new sub-rendering task is detected, the new sub-rendering task for execution.

12. The method of claim 10, wherein the method is executed by a main thread, and the main thread is configured to render elements of the second set of one or more interface elements upon completing the rendering of the first set of one or more interface elements, the elements of the second set of one or more interface elements that are rendered by the main thread are not breakable into sub-rendering tasks.

13. The method of claim 1, wherein:

rendering of the first set of one or more interface elements is independent from or prior to rendering of the second set of one or more interface elements.

14. The method of claim 13, wherein the rendering of the second set of one or more interface elements comprises:

tasking rendering tasks corresponding to rendering an element of the second set of interface elements to a queue; and executing the rendering tasks in the queue by multiple threads.

15. The method of claim 1, wherein at least one of the first set of one or more interface elements and at least one of the second set of one or more interface elements are output at different times.

16. The method of claim 1, wherein the pre-configured priority condition comprises a user affinity condition, and the user affinity condition is determined based at least in part on historical behavior of the user with respect to the target UI.

17. The method of claim 1, wherein the first set of one or more interface elements are rendered by a main thread, the second set of one or more interface elements are rendered using multithreading, and in response to a determination that rendering of the first set of one or more interface elements is completed, the main thread renders at least one sub-rendering task for the rendering of the second set of one or more interface elements.

18. A system, comprising:
one or more processors configured to:
load a plurality of interface elements associated with a target user interface (UI);
determining, from among the plurality of interface elements, a first set of one or more interface elements and a second set of one or more interface elements, wherein:
at least one of the first set of one or more interface elements and the second set of one or more interface elements is determined based at least in part on a determination that respective interface elements of the plurality of interface element satisfy a pre-configured priority condition;
the determination that respective interface elements of the plurality of interface elements satisfy the pre-configured priority condition is based at least in part on whether a value of an identifier corresponding to the respective interface elements is indicative of the respective interface elements being part of a layout configuration of the target UI; and
the value of the identifier corresponding to the respective interface elements is obtained from a configuration file or layout code for the target UI;
obtain the first set of one or more interface elements associated with the target UI to be rendered;
render the first set of one or more interface elements at a higher priority than other interface elements associated with the target UI, wherein the first set of one or more interface elements are rendered concurrently with a second set of one or more interface elements, and the first set of one or more interface elements and the second set of one or more interface elements are rendered according to different priorities; and
output a rendering result of the first set of one or more interface elements; and
one or more memories coupled to the one or more processors, configured to provide the one or more processors with instructions.

19. The system of claim 18, wherein the pre-configured priority condition comprises one or more of the following: a configuration condition related to a layout of the target UI, a user affinity condition, a background color condition, and/or a background condition.

20. A computer program product, the computer program product being embodied in a non-transitory computer readable storage medium and comprising computer instructions for:
loading a plurality of interface elements associated with a target user interface (UI);
determining, from among the plurality of interface elements, a first set of one or more interface elements and a second set of one or more interface elements, wherein:
at least one of the first set of one or more interface elements and the second set of one or more interface elements is determined based at least in part on a determination that respective interface elements of the plurality of interface element satisfy a pre-configured priority condition;
the determination that respective interface elements of the plurality of interface elements satisfy the pre-configured priority condition is based at least in part on whether a value of an identifier corresponding to the respective interface elements is indicative of the respective interface elements being part of a layout configuration of the target UI; and
the value of the identifier corresponding to the respective interface elements is obtained from a configuration file or layout code for the target UI;
obtaining the first set of one or more interface elements associated with the target UI to be rendered;
rendering the first set of one or more interface elements at a higher priority than other interface elements associated with the target UI, wherein the first set of one or more interface elements are rendered concurrently with a second set of one or more interface elements, and the first set of one or more interface elements and the second set of one or more interface elements are rendered according to different priorities; and
outputting a rendering result of the first set of one or more interface elements.

21. A method, comprising:
obtaining a first set of one or more interface elements associated with a target user interface (UI) to be rendered, the first set of one or more interface elements comprising one or more interface elements that meet a pre-configured priority condition;
rendering the first set of one or more interface elements at a higher priority than other interface elements associated with the target UI, wherein the first set of one or more interface elements are rendered concurrently with a second set of one or more interface elements, and the first set of one or more interface elements and the second set of one or more interface elements are rendered according to different priorities; and
outputting a rendering result of the first set of one or more interface elements,
wherein the method is executed by a main thread, and the main thread is configured to render elements of the second set of one or more interface elements upon completing the rendering of the first set of one or more interface elements, the elements of the second set of one or more interface elements that are rendered by the main thread are not breakable into sub-rendering tasks.

22. A method, comprising:
obtaining a first set of one or more interface elements associated with a target user interface (UI) to be rendered, the first set of one or more interface elements comprising one or more interface elements that meet a pre-configured priority condition;
rendering the first set of one or more interface elements at a higher priority than other interface elements associated with the target UI, wherein the first set of one or more interface elements are rendered concurrently with a second set of one or more interface elements, and the first set of one or more interface elements and the second set of one or more interface elements are rendered according to different priorities; and
outputting a rendering result of the first set of one or more interface elements,
wherein the first set of one or more interface elements are rendered by a main thread, the second set of one or more interface elements are rendered using multi-threading, and in response to a determination that rendering of the first set of one or more interface elements is completed, the main thread renders at least one sub-rendering task for the rendering of the second set of one or more interface elements.

* * * * *